US009227625B2

(12) United States Patent
Rieker et al.

(10) Patent No.: US 9,227,625 B2
(45) Date of Patent: Jan. 5, 2016

(54) METHOD FOR OPERATING A DRIVING SYSTEM, IN PARTICULAR, OF A MOTOR VEHICLE

(71) Applicant: Robert Bosch GmbH, Stuttgart (DE)

(72) Inventors: Daniel Rieker, Ditzingen (DE); Frank Meier, Stuttgart (DE); Bernd Kesch, Hemmingen (DE); Holger Jessen, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/556,348

(22) Filed: Dec. 1, 2014

(65) Prior Publication Data

US 2015/0151735 A1    Jun. 4, 2015

(30) Foreign Application Priority Data

Dec. 2, 2013    (DE) .......................... 10 2013 224 677

(51) Int. Cl.
*B60W 20/00*    (2006.01)
*B60W 10/06*    (2006.01)
*B60W 10/08*    (2006.01)
*B60W 30/194*   (2012.01)

(52) U.S. Cl.
CPC ................ *B60W 20/10* (2013.01); *B60W 10/06* (2013.01); *B60W 10/08* (2013.01); *B60W 20/50* (2013.01); *B60W 30/194* (2013.01); *B60W 2510/0657* (2013.01)

(58) Field of Classification Search
USPC ........... 701/22; 180/65.265, 65.285; 903/902; 123/478, 492
See application file for complete search history.

(56) References Cited

U.S. PATENT DOCUMENTS 5,675,080 A * 10/1997 Wada ...................... F01P 11/14
                                                    123/568.16
6,317,681 B2 * 11/2001 Elliott ..................... 123/406.16
(Continued)

FOREIGN PATENT DOCUMENTS

JP      407324669 A  * 12/1995
JP      409184439 A  *  7/1997
JP     02010249252 A * 11/2010

OTHER PUBLICATIONS

An Accelerometer Error Compensation Method Based on Forward Velocity Estimation; Pei Dong; Sheng Wei; Instrumentation, Measurement, Computer, Communication and Control (IMCCC), 2013 Third International Conference on; Year: 2013; pp. 652-657, DOI: 10.1109/IMCCC.2013.145.*

(Continued)

*Primary Examiner* — Cuong H Nguyen
(74) *Attorney, Agent, or Firm* — Kenyon & Kenyon LLP

(57) ABSTRACT

A method for operating a driving system of a motor vehicle, in particular, the driving system having an internal combustion engine and at least one electric motor, and during warm-up of the internal combustion engine, the latter being loaded with a specifiable torque; and the at least one electric motor generating a torque at least at times, to unload or load the internal combustion engine. An actual torque of the internal combustion engine is compared to a specifiable first setpoint torque of the internal combustion engine; a difference of the actual torque from the first setpoint torque being formed; and a time integral being formed over the difference formed; and a fault detected in the warm-up of the internal combustion engine, as a function of the time integral formed.

16 Claims, 3 Drawing Sheets

(56) References Cited

U.S. PATENT DOCUMENTS

| | | | |
|---|---|---|---|
| 7,347,175 B2* | 3/2008 | Lupo | F02D 41/042 123/179.4 |
| 7,585,408 B2* | 9/2009 | Weindorf | B01D 35/143 123/196 A |
| 8,224,517 B2* | 7/2012 | Eser | F01P 5/14 123/41.01 |
| 8,437,897 B2* | 5/2013 | Blind | B60K 6/48 701/22 |
| 2001/0015197 A1* | 8/2001 | Elliott | F02D 35/027 123/406.16 |
| 2006/0011524 A1* | 1/2006 | Weindorf | B01D 35/143 210/86 |
| 2006/0150937 A1* | 7/2006 | Lupo | F02D 41/042 123/179.4 |
| 2011/0056185 A1* | 3/2011 | Bradley | F01N 3/00 60/274 |
| 2011/0098883 A1* | 4/2011 | Eser | F01P 5/14 701/33.4 |
| 2011/0264315 A1* | 10/2011 | Blind | B60K 6/48 701/22 |

OTHER PUBLICATIONS

The design and implementation of an automated bus in revenue service on a bus rapid transit line; Han-Shue Tan; Jihua Huang; American Control Conference (ACC), 2014; Year: 2014; pp. 5288-5293, DOI: 10.1109/ACC.2014.6859369.*

Centralised Diagnostics of Electronic and Electric Equipment in Vehicles, Engine Lighting Equipment Testing; Jezdik, P. Intelligent Data Acquisition and Advanced Computing Systems: Technology and Applications, 2007. IDAACS 2007. 4th IEEE Workshop on; Year: 2007; pp. 129-131, DOI: 10.1109/IDAACS.2007.4488389.*

Embedded diagnostic system design using an automated diagnostic tool set; Granieri, Michael N.; Levy, F.J.; Autotestcon '93. IEEE Systems Readiness Technology Conference. Proceedings; Year: 1993; pp. 645-649, DOI: 10.1109/AUTEST.1993.396294.*

Adaptive PID-Sliding-Mode Fault-Tolerant Control Approach for Vehicle Suspension Systems Subject to Actuator Faults; Moradi, M.; Fekih, A.; Vehicular Technology, IEEE Transactions on; Year: 2014, vol. 63, Issue: 3; pp. 1041-1054, DOI: 10.1109/TVT.2013.2282956.*

Monitoring tire-road friction using the wheel slip; Gustafsson, F.; Control Systems, IEEE; Year: 1998, vol. 18, Issue: 4; pp. 42-49, DOI: 10.1109/37.710877.*

* cited by examiner

METHOD FOR OPERATING A DRIVING SYSTEM, IN PARTICULAR, OF A MOTOR VEHICLE

FIELD OF THE INVENTION

The present invention relates to a method, as well as a control and/or regulating device, a computer program and a driving system according.

BACKGROUND INFORMATION

Motor vehicles are believed to be in the marketplace which are produced as hybrid vehicles and have a driving system which includes an internal combustion engine and at least one electric motor. A so-called "load-point shift" may be carried out using the electric motor, for example, which particularly also makes possible measures for lowering undesired exhaust gas emissions. One patent publication from this specialized field is German document DE 10 2009 027 641 A1, for example.

SUMMARY OF THE INVENTION

The object on which the present invention is based is attained by a method according to the description herein as well as by a control and/or regulating device, a computer program and a driving system according to the alternative description herein. Advantageous further developments are indicated in the further descriptions herein. Important features for the present invention are also found in the following description and in the drawings; the features may be important for the present invention both by themselves and also in different combinations, without any further explicit reference being made.

The present invention relates to a method for operating a driving system of a motor vehicle in particular, the driving system having an internal combustion engine and at least one electric motor, and during warm-up of the internal combustion engine, the latter being loaded with a specifiable torque, and the at least one electric motor generating a torque at least at times, in order to load or unload the internal combustion engine. According to the present invention, an actual torque of the internal combustion engine is compared to a specifiable first setpoint torque of the internal combustion engine, a difference of the actual torque from the first setpoint torque being formed, and via the formed difference, a time integral is formed, and as a function of the formed time integral, a fault is detected in the warm-up of the internal combustion engine. The present invention particularly enables monitoring in conformance to CSERS guidelines ("cold start emission reduction strategy") of a so-called "load-point shift" of the internal combustion engine, this being unloaded or loaded, case by case, by a torque being generated by the electric motor. The requirement according to "CSERS" is included in a main chapter of US-OBD-II legislation (OBD="onboard diagnostics"). One advantage of the present invention is that the monitoring may be carried out using an ascertainment and evaluation of combustion engine variables, so that in general, no variables affecting the electric motor are required for the monitoring. This is also of advantage because it is the internal combustion engine itself which produces pollutants in the exhaust gas. Consequently, there is a direct relationship between the monitoring according to the present invention and the creator of the pollutants.

The method of the present invention for operating the driving system enables monitoring a warm-up of the internal combustion engine, particularly using a comparison of the actual torque to the first setpoint torque. One may indirectly conclude as to the performance reliability of the electric motor, if necessary, for instance, in that, in the case of a possible fault of the electric motor, the actual torque of the internal combustion engine could no longer follow the first setpoint torque. Thus, direct monitoring of the electric motor is possibly superfluous.

A first possibility after a cold start of the internal combustion engine is to load it in a warm-up using the electric motor, so that the internal combustion engine gives off a comparatively high torque, whereby a comparatively great exhaust gas mass flow is generated. An alternative possibility is to unload the internal combustion engine in the warm-up using the electric motor, so that the internal combustion engine gives off a comparatively low torque, whereby a comparatively small exhaust gas mass flow is generated. In this case, however, comparatively low harmful exhaust gas emissions are generated per unit of time.

In one embodiment of the method, in a time interval in which an operating state of the internal combustion engine is changed and/or a change in the operating state is to be expected, the time integral is not changed. The change in the operating state relates, for example, to a time interval directly after the cold start of the internal combustion engine, in which the actual torque is very large at the beginning, and thereafter runs comparatively irregularly. It also relates to a time interval which characterizes a change of a driving position in a transmission device. It also relates to a time interval which characterizes a change in an injection method for the internal combustion engine, especially a change from single injection to multiple injection, or vice versa. It also relates to a time interval which characterizes an increase in the drive torque requested by the driver of the motor vehicle. Thereby such time intervals may advantageously be "faded out" in which the load-point shift mentioned, of the internal combustion engine, is not able to be carried out correctly for a short time, on account of which inappropriate fault messages may be avoided. As a criterion for the said "fadings out", suitable "switching-on conditions" may in each case be specified. Comparatively large fluctuations of the actual torque of the internal combustion engine occurring directly after the cold start, which may lead to a correspondingly great deviation in the comparison of the actual torque to the first setpoint torque, may be taken into account, for instance, using a "delay time", the monitoring according to the present invention being started in a correspondingly delayed manner. This may be implemented, for instance, by taking into account one or more additional "switching-on conditions", which are ascertained based on specifiable physical variables. One such variable is an integrated air mass flow as of the cold start that has taken place, for example. In this first phase after the cold start, the load-point shift is generally not yet fully active.

Furthermore, it may be provided that the forming of the time integral is activated as a function of a condition. Beginning as of the cold start of the internal combustion engine, the formation of the time integral relevant for the monitoring of the warm-up is then carried out when the condition is satisfied, and the internal combustion engine and the electric motor are, for instance, at least approximately in a stationary operation. Compare also the abovementioned "delay time".

The condition may, for instance, be produced in that the first setpoint torque ("-CSERS") is compared to a second setpoint torque ("-nonCSERS") of the internal combustion engine, the second setpoint torque characterizing an operating state of the driving system, in which the electric motor would be operated without the presence of the warm-up, particularly independently of the operating manner specified especially for reducing the harmful exhaust gas emissions of the internal combustion engine, and in that the formation of the time integral is carried out when an absolute amount of a difference of the first and the second setpoint torque of the internal combustion engine exceeds a first threshold value. A particularly suitable monitoring of the internal combustion engine may be achieved by this.

Alternatively, the start condition may be produced by starting the formation of the time integral as a function of the torque of the electric motor.

Corresponding to this, it may be provided that a first setpoint torque ("-CSERS") of the electric motor is compared to a second setpoint torque ("-nonCSERS") of the electric motor, the second setpoint torque characterizing an operating state of the driving system in which the electric motor would be operated without the presence of a warm-up, particularly independently of the operating manner specified especially for reducing the harmful exhaust gas emissions of the internal combustion engine, and that the forming of the time integral is started when an absolute amount of a difference of the first and the second setpoint torque of the electric motor exceeds a second threshold value.

Thereby, that is, alternatively two advantageous possibilities are described for producing the start condition.

In one embodiment of the method, an amount is ascertained from the formed difference of the actual torque from the first setpoint torque of the internal combustion engine, and the time integral is formed over the ascertained absolute amount.

By the forming of the absolute amount, all the deviations of the actual torque from the setpoint torque of the internal combustion engine are recorded, without the positive and negative deviations being able to compensate for one another. Because of that, the monitoring of the warm-up of the internal combustion engine, according to the present invention are further improved.

In one embodiment of the method that is alternative to forming the amount, when the electric motor generates a torque in order to load the internal combustion engine, a first time integral is formed which is only changed if the actual torque of the internal combustion engine is less than the first setpoint torque of the internal combustion engine, and if the electric motor generates a torque in order to unload the internal combustion engine, a second time integral is formed, which is only changed if the actual torque of the internal combustion engine is greater than the first setpoint torque of the internal combustion engine. Thus, depending on the operating strategy, two time integrals may be formed, from which additional advantages may come about. For instance, in a so-called "load-point increase" of the internal combustion engine, only a negative deviation (in which therefore the actual torque is less than the first setpoint torque of the internal combustion engine) is taken into account and integrated. In this context, the second setpoint torque is less that the first setpoint torque. Correspondingly, in a so-called "load-point reduction" of the internal combustion engine, only a positive deviation (that is, in which the actual torque is greater than the first setpoint torque of the internal combustion engine) is taken into account and integrated. In this context, the second setpoint torque is greater that the first setpoint torque. The remaining method steps, when using two integrals, correspond to the method steps when using the abovementioned one integral with the formation of the absolute amount. This comes about correspondingly for the following additional method steps.

In one embodiment of the method, it is provided that the formation of the time integral is terminated when the warm-up of the internal combustion engine is ended and/or the first setpoint torque of the internal combustion engine lies outside a specifiable torque range of the internal combustion engine for at least a specifiable time span. This may, for example, characterize an operating state of the internal combustion engine, in which such a great torque requirement by the driver takes place, that the internal combustion engine is no longer able to be operated within the specifiable torque range ("strategic torque", "torque band") in a range of the first setpoint torque. Then it may be of advantage to end the warm-up of the internal combustion engine and, correspondingly, the monitoring according to the present invention by terminating the formation of the time integral. In this context, a current value of the time integral is not changed any more, and is consequently available for an evaluation. In a comparable way, the formation of the time integral may also be terminated in case the first setpoint torque of the internal combustion engine lies below the specifiable torque range for at least one specifiable time span.

In one embodiment of the present invention, an accumulated time duration is ascertained between a start and an end of the formation of the time integral, in which, corresponding to the formation of the time integral, those time intervals in the accumulated time duration are not taken into account, in which an operating state of the internal combustion engine is changed and/or a change in the operating state of the internal combustion engine is to be expected. The ascertainment of the accumulated time duration brings about advantageous possibilities for specifically evaluating the ascertained value of the time integral. The time intervals in which the accumulated time duration is not ascertained or taken into account, may correspond to the time intervals described above, in which the time integral is not changed.

Furthermore, it may be provided that after the end of the formation of the time integral, a value of the time integral is divided by the accumulated time duration. This division particularly has the advantageous purpose that the duration of the integration using the time integral is essentially unimportant for a subsequent evaluation.

In one embodiment of the present invention, this evaluation takes place in that the value of the time integral divided by the accumulated time duration is compared to a third threshold value, and if the value of the time integral divided by the accumulated time duration is greater than the third threshold value, a fault is detected in the warm-up of the internal combustion engine. Thereby the valuation of the value of the time integral, divided by the accumulated time duration, may take place particularly simply and comparatively accurately. In case two different time integrals are formed, there takes place, for each separately, the division and the threshold value comparison to a third and fourth threshold value.

Furthermore, it may be provided that an entry takes place in a fault memory of a diagnostic device for the driving system or for the motor vehicle and/or that a warning notice for the driver takes place and/or that a fault routine is carried out using a computer program that controls the driving system, or rather the motor vehicle. With that, in the case of a detected fault in the warm-up, a reaction is able to take place that is suitable in each case, whereby possibly damage may be detected and removed on the driving system, and thus excessive exhaust gas emissions may be avoided.

Furthermore, the present invention includes a control and/or regulating device for an internal combustion engine, in which the control and/or regulating device is configured to carry out the method according to the present invention described above. This may take place using a computer program that is programmed for this purpose.

Furthermore, the present invention includes a driving system of a motor vehicle in particular, the driving system having an internal combustion engine and at least one electric motor as well as a control and/or regulating device.

Exemplary specific embodiments of the present invention are elucidated in greater detail below, with reference to the appended drawings.

The same reference numerals are used for functionally equivalent elements and variables in all the figures, even in different specific embodiments.

DETAILED DESCRIPTION

Figure 1:
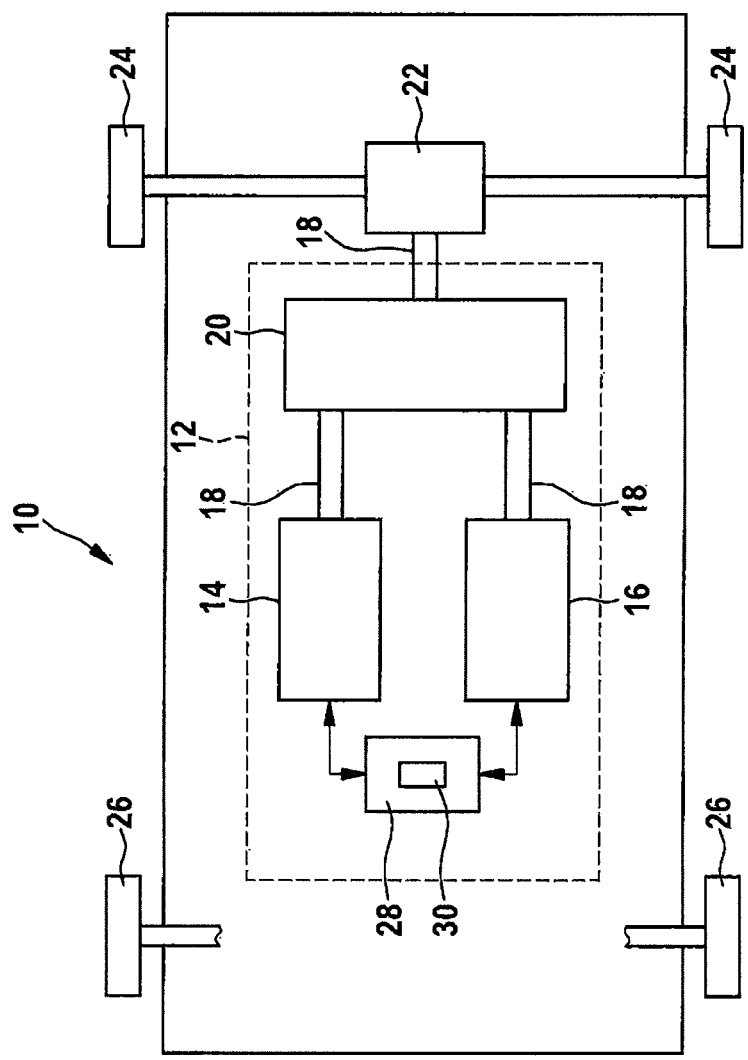
FIG. 1 shows a schematic representation of a motor vehicle having a driving system which includes an internal combustion engine and an electric motor.

FIG. 1 shows schematically a motor vehicle 10 having a driving system 12 enclosed in a dashed-line frame, which has an internal combustion engine 14 and an electric motor 16. Internal combustion engine 14 and electric motor 16 are connected to a transmission device 20 using shafts 18. Transmission device 20 is connected to a differential 22, which is connected via axles (having no reference numerals) to driving wheels 24. Furthermore, motor vehicle 10 includes two running wheels 26.

In a left middle region in FIG. 1, a control and/or regulating device 28 is shown which includes a computer program 30 and is able to control or regulate an operation of the internal combustion engine 14 and of the electric motor 16. Motor vehicle 10 is presently also a so-called "hybrid vehicle".

Figure 2:
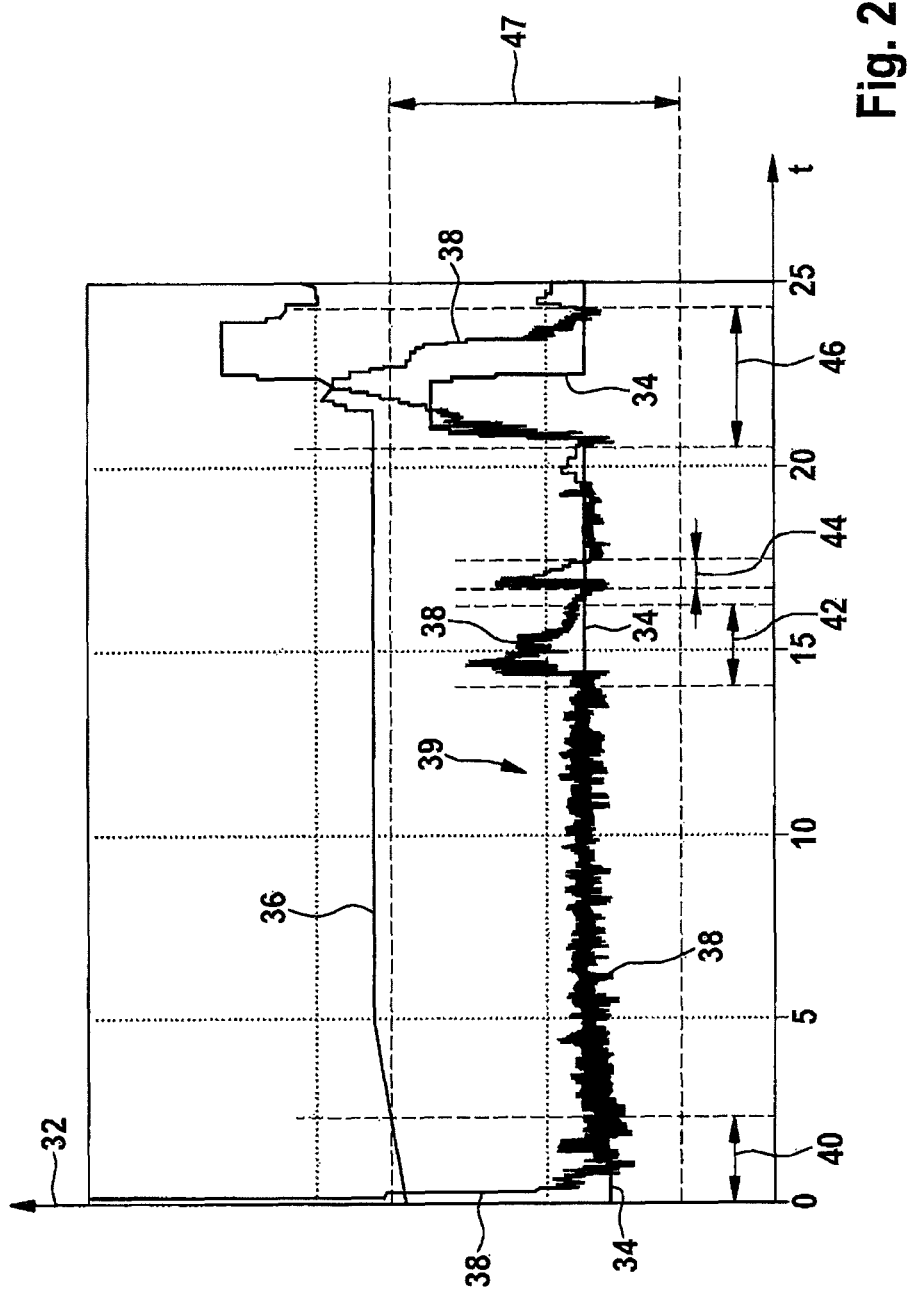
FIG. 2 shows a diagram over time for the operation of the driving system of FIG. 1.

FIG. 2 shows a diagram over time for an operation of the driving system 12. On the abscissa of the coordinate system shown, a time t is entered, and in the direction of the ordinate 32, three curves overall are imaged. What is shown, for example, is a time span, in this instance, of 25 seconds after the cold start of internal combustion engine 14, whereby a warm-up of internal combustion engine 14 is characterized at least in sections.

An upper curve in the drawing shows a time curve of a "second" setpoint torque 36 of internal combustion engine 14, which characterizes an operating state of internal combustion engine 14, in which electric motor 16 is or would be operated not at all or independently of the operating manner specified especially for reducing the harmful exhaust gas emissions of internal combustion engine 14. Second setpoint torque 36, so to speak, characterizes a load of internal combustion engine 14, as it would turn out without an "active cold start measure". As the "active cold start measure", one may understand presently an operation of driving system 12, when electric motor 16 is being operating within the meaning of a reduction in the harmful exhaust gas emissions of internal combustion engine 14.

The operation of driving system 12 during the "active cold start measure" may take place in such a way that an exhaust of harmful exhaust gas emissions caused by internal combustion engine 14 is minimized in total. A first possibility for this is to load internal combustion engine 14 in the warm-up using the electric motor, so that internal combustion engine 14 gives off a comparatively high torque, whereby a comparatively large exhaust gas mass flow is generated. An alternative possibility is to unload internal combustion engine 14 in the warm-up using electric motor 16, so that internal combustion engine 14 gives off a comparatively low torque, whereby a comparatively small exhaust gas mass flow is generated. In this case, however, comparatively low harmful exhaust gas emissions are generated per unit of time.

A lower curve in the drawing, which runs as a straight line at least in sections, shows a time curve of a "first" setpoint torque 34 of internal combustion engine 14, which characterizes an operating state of the internal combustion engine 14 in which electric motor 16 is operated as a supplement to internal combustion engine 14, in order to minimize overall the exhaust of harmful exhaust gas emissions described above. This takes place in FIG. 2 in that internal combustion engine 14 is unloaded by electric motor 16, that is, it is being supported. This is also described as a "load-point shift". A difference 53 (see FIG. 3) of first setpoint torque 34 from second setpoint torque 36 thus characterizes essentially a setpoint torque of electric motor 16. First setpoint torque 34 of internal combustion engine 14 may be an "indicated" setpoint torque 34.

A lower curve in the drawing, which essentially, and at least in sections, approaches the time curve for first setpoint torque 34, shows a time curve of an actual torque 38 of internal combustion engine 14. An arrow in the middle of FIG. 2 points in exemplary fashion to a difference 39 of actual torque 38 from first setpoint torque 34. Actual torque 38 of internal combustion engine 14 may be an "indicated" actual torque 38.

Furthermore, FIG. 2 shows from left to right four time intervals 40, 42, 44 and 46, in which an operating state of internal combustion engine 14 is changed and/or a change in the operating state is to be expected. The four time intervals 40, 42, 44 and 46 characterize, so to speak, "irregularities" in the operation of internal combustion engine 14.

First time interval 40 characterizes an operating state directly after a cold start of internal combustion engine 14, in which the actual torque 38 is very large at the beginning, and thereafter runs comparatively irregularly. Second time interval 42 characterizes a change in a driving position in transmission device 20. Third time interval 44 characterizes a change in an injection method for internal combustion engine 14, especially a change from single injection to multiple injection, or vice versa. Fourth time interval 46 characterizes an increase in drive torque requested by the driver of motor vehicle 10.

Furthermore, in FIG. 2, a specifiable torque range 47 ("torque band") is drawn in for first setpoint torque 34, which is shown in the drawing by horizontal dashed lines and by a double arrow.

One may see that actual torque 38 is generally well approximated to first setpoint torque 34 of internal combustion engine 14. In the four time intervals 40, 42, 44 and 46, however, as may be seen in FIG. 2, noticeable deviations are present for the reasons described above. In order to monitor the warm-up of internal combustion engine 14, actual torque 38 of internal combustion engine 14 may be compared to specifiable first setpoint torque 34, by which difference 39 of actual torque 38 from first setpoint torque 34 is formed. This is explained in more detail below with the aid of FIG. 3. Thereby the "monitoring of cold start measures of the internal combustion engine" or a ("Cold Start Emission Reduction Strategy Monitoring) according to US OBD-II-legislation (CCR 1968.2) is made possible, the monitoring may be able to take place solely using variables ascertained from the operation of internal combustion engine 14. The abbreviation "CCR" stands for "California Code of Regulations". The specification of a monitoring according to "CSERS" is contained in a main chapter of the "CCR" regulations.

Figure 3:
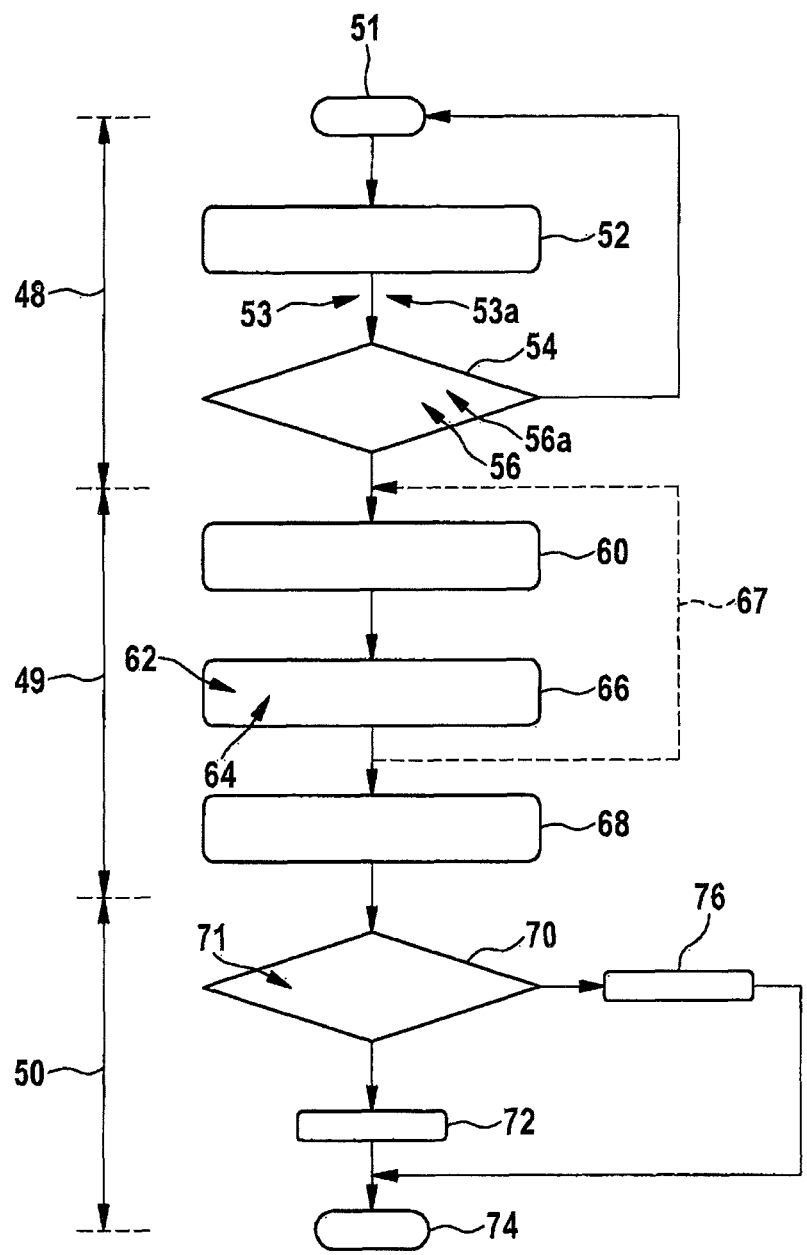
FIG. 3 shows a flow chart for a method for operating the driving system from FIG. 1.

FIG. 3 shows a flow chart for a method for operating driving system 12 of motor vehicle 10, especially for the monitoring of the warm-up described with FIG. 2. In the drawing, from top to bottom, the flow chart includes a first section 48, a subsequent second section 49 and subsequent to that, a third section 50, which are each marked by a double arrow.

The procedure shown in FIG. 3 begins in a start block 51. In a following block 52, a difference 53 is ascertained between first setpoint torque 34 and second setpoint torque 36 of internal combustion engine 14.

In a following query block 54 it is queried whether an absolute amount of difference 53 is greater than a first threshold value 56 and whether, if applicable, additional conditions are satisfied. If this is inapplicable, the system branches back to start block 51. This means that currently no starting condition ("switching on condition") is fulfilled for subsequent second section 49 of the method, and consequently the procedure remains in first section 48 for the time being.

Alternatively, in first section 48 of the method, determined by blocks 51, 52 and 54, a first setpoint torque of electric motor 16 may be compared to a second setpoint torque of electric motor 16, the second setpoint torque characterizing an operating state of driving system 12, in which electric motor 16 is operated with the typical requirement outside the CSERS operating state of internal combustion engine 14. It is then queried whether an absolute amount of a difference 53$a$ of the first and the second setpoint torque of electric motor 16 exceeds a second threshold value 56$a$. If this is not the case, branching goes back to start block 51.

Provided the conditions of query block 54 are applicable, the system branches from query block 54 to a following block 60. In block 60, the difference 39 is ascertained between first setpoint torque 34 and actual torque 38 of internal combustion engine 14. At the same time, in block 60 formation of a time integral 62 is started or continued, and the ascertainment of an accumulated time duration 64 is also started or continued.

In a subsequent block 66, an absolute amount is ascertained of the difference 39 formed, and time integral 62 divided by the ascertained amount is formed. In this context, in a respective time interval 40, 42, 44 and/or 46 in which the operating state of internal combustion engine 14 is changed or a change in the operating state is to be expected, time integral 62 is not changed, which means that a respective current value of time integral 62 remains constant in time intervals 40, 42, 44 and 46. Similarly, in time intervals 40, 42, 44 and 46, the accumulated time duration 64 also remains constant and is "stopped", so to speak. The partial procedure described by blocks 60 and 66 is first continuously repeated, which is symbolized in the drawing by a dashed line 67. The process of "not changing" time integral 62 and of "stopping" accumulated time duration 64 is in connection with the condition checked by query block 54.

In a subsequent block 68, the formation of time integral 62 is then ended (in deviation from line 67) when the operating state according to "CSERS" is ended and/or when first setpoint torque 34 of internal combustion engine 14 lies for at least one specifiable time span outside specifiable torque range 47 of internal combustion engine 14. This may take place when first setpoint torque 34 is greater than a maximum value (see FIG. 2) included by torque range 47.

If this condition is also satisfied, then in block 68, a current value of time integral 62 is divided by a current value of accumulated time duration 64. The division especially serves the purpose that a duration of the integration is essentially insignificant to a following valuation in subsequent third section 50 of the method.

In a following query block 70 it is queried whether the quotient ascertained in block 68 is greater than a third threshold value 71. If this is not applicable, the system branches to a following block 72. In block 72, one may now conclude from this that no substantial fault had occurred in the operation of driving system 12 in the warm-up of internal combustion engine 14 ("quality test"). The procedure shown in FIG. 3 ends in an end block 74.

On the other hand, if the condition checked in query block 70 is satisfied (and thus the quotient ascertained is greater than third threshold value 71), branching takes place to a block 76. In block 76, a fault is detected in the warm-up of internal combustion engine 14. Since it is important during the warm-up of internal combustion engine 14 that actual torque 38 corresponds as well as possible to specifiable first setpoint torque 34, deviations summed up using time integral 62 are thus compared to third threshold value 71 and evaluated as a "fault" if necessary. For example, an entry can then be made in a fault memory of a diagnostic device for internal combustion engine 14 or rather for motor vehicle 10 and/or a fault notice for the driver may take place and/or a fault routine using computer program 30, that controls internal combustion engine 14 or driving system 12 or motor vehicle 10 may be carried out. After block 76, the method also branches to end block 74.

In one specific embodiment not shown for the method described in FIG. 3, at the time when electric motor 16 generates a torque to load internal combustion engine 14, a first time integral 62$a$ is formed, which is only changed if actual torque 38 of internal combustion engine 14 is less than first setpoint torque 34 of internal combustion engine 14. Correspondingly, at the time when electric motor 16 generates a torque to unload internal combustion engine 14, a second time integral 62$b$ is formed, which is only changed if actual torque 38 of internal combustion engine 14 is greater than first setpoint torque 34 of internal combustion engine 14. The processing in the remaining blocks of FIG. 3 analogously takes place in this embodiment as has been described above.

What is claimed is:

1. A method for operating a driving system of a motor vehicle, the driving system having an internal combustion engine and at least one electric motor, the method comprising:
   loading, during a warm-up of the internal combustion engine, the motor with a specifiable torque;
   generating, via the at least one electric motor, at least at times a torque to unload or to load the internal combustion engine;
   comparing an actual torque of the internal combustion engine to a specifiable first setpoint torque of the internal combustion engine;
   forming a difference of the actual torque from the first setpoint torque;
   forming a time integral over the difference; and
   detecting a fault in the warm-up of the internal combustion engine, as a function of the time integral.

2. The method of claim 1, wherein, in a time interval in which an operating state of the internal combustion engine is changed and/or a change in the operating state is to be expected, the time integral is not changed.

3. The method of claim 1, wherein the forming of the time integral is activated as a function of a condition.

4. The method of claim 3, wherein the first setpoint torque is compared to a second setpoint torque of the internal combustion engine, the second setpoint torque characterizing an operating state of the driving system, in which the electric motor would be operated without the presence of the warm-up, and wherein the forming of the time integral is performed if an absolute amount of a difference of the first setpoint torque and the second setpoint torque of the internal combustion engine exceeds a second threshold value.

5. The method of claim 3, wherein the forming of the time integral is started as a function of the torque of the electric motor.

6. The method of claim 5, wherein a first setpoint torque of the electric motor is compared to a second setpoint torque of the electric motor, the second setpoint torque characterizing an operating state of the driving system, in which the electric motor would be operated without the presence of the warm-up, and wherein the forming of the time integral is started if an absolute amount of a difference of the first setpoint torque and the second setpoint torque of the electric motor exceeds a second threshold value.

7. The method of claim 1, wherein an absolute amount is ascertained from the difference formed of the actual torque from the first setpoint torque of the internal combustion engine, and wherein the time integral is formed over the ascertained absolute amount.

8. The method of claim 1, wherein, when the electric motor generates a torque to load the internal combustion engine, a first time integral is formed, which is only changed if the actual torque of the internal combustion engine is less than the first setpoint torque of the internal combustion engine, and wherein if the electric motor generates a torque to unload the internal combustion engine, a second time integral is formed, which is only changed if the actual torque of the internal combustion engine is greater than the first setpoint torque of the internal combustion engine.

9. The method of claim 1, wherein the formation of the time integral is terminated when the warm-up of the internal combustion engine is ended and/or the first setpoint torque of the internal combustion engine lies outside a specifiable torque range of the internal combustion engine for at least a specifiable time span.

10. The method of claim 1, wherein an accumulated time duration is ascertained between a start and an end of the formation of the time integral, those time intervals in the accumulated time duration not being taken into account in which an operating state of the internal combustion engine is changed and/or a change in the operating state of the internal combustion engine is to be expected.

11. The method of claim 10, wherein after the end of the formation of the time integral a value of the time integral is divided by the accumulated time duration.

12. The method of claim 11, wherein the value of the time integral divided by the accumulated time duration is compared to a third threshold value, and if the value of the time integral divided by the accumulated time duration is greater than the third threshold value, a fault is detected in the warm-up of the internal combustion engine.

13. The method of claim 12, wherein an entry occurs in a fault memory of a diagnostic device for the driving system, or for the motor vehicle and/or a warning notice for the driver occurs and/or a fault routine is performed using a computer program that controls the driving system, or the motor vehicle.

14. A control and/or regulating device for an internal combustion engine, comprising:
an operating arrangement for operating a driving system of a motor vehicle, the driving system including the internal combustion engine and at least one electric motor, including:
a loading arrangement to load, during a warm-up of the internal combustion engine, the motor with a specifiable torque;
a generating arrangement to generate, via the at least one electric motor, at least at times a torque to unload or to load the internal combustion engine;
a comparing arrangement to compare an actual torque of the internal combustion engine to a specifiable first setpoint torque of the internal combustion engine;
a difference forming arrangement to form a difference of the actual torque from the first setpoint torque;
a time integral forming arrangement to form a time integral over the difference; and
a detecting arrangement to detect a fault in the warm-up of the internal combustion engine, as a function of the time integral.

15. A computer readable medium having a computer program, which is executable by a processor, comprising:
a program code arrangement having program code for operating a driving system of a motor vehicle, the driving system having an internal combustion engine and at least one electric motor, by performing the following:
loading, during a warm-up of the internal combustion engine, the motor with a specifiable torque;
generating, via the at least one electric motor, at least at times a torque to unload or to load the internal combustion engine;
comparing an actual torque of the internal combustion engine to a specifiable first setpoint torque of the internal combustion engine;
forming a difference of the actual torque from the first setpoint torque;
forming a time integral over the difference; and
detecting a fault in the warm-up of the internal combustion engine, as a function of the time integral.

16. A driving system of a motor vehicle, comprising:
an internal combustion engine;
at least one electric motor; and
a control and/or regulating device for an internal combustion engine, including an operating arrangement for operating a driving system of the motor vehicle, the driving system including the internal combustion engine and at least one electric motor, including:
a loading arrangement to load, during a warm-up of the internal combustion engine, the motor with a specifiable torque;
a generating arrangement to generate, via the at least one electric motor, at least at times a torque to unload or to load the internal combustion engine;
a comparing arrangement to compare an actual torque of the internal combustion engine to a specifiable first setpoint torque of the internal combustion engine;
a difference forming arrangement to form a difference of the actual torque from the first setpoint torque;
a time integral forming arrangement to form a time integral over the difference; and
a detecting arrangement to detect a fault in the warm-up of the internal combustion engine, as a function of the time integral.

* * * * *